(12) United States Patent  (10) Patent No.: US 7,819,078 B2
Johannessen  (45) Date of Patent: Oct. 26, 2010

(54) COMPACT PAINT SYSTEM

(75) Inventor: Robert A. Johannessen, Quincy, IL (US)

(73) Assignee: Konstant Products, Inc., Skokie, IL (US)

( * ) Notice: Subject to any disclaimer, the term of this patent is extended or adjusted under 35 U.S.C. 154(b) by 755 days.

(21) Appl. No.: 11/485,954

(22) Filed: Jul. 13, 2006

(65) Prior Publication Data

US 2008/0014361 A1    Jan. 17, 2008

(51) Int. Cl.
*B05B 3/00* (2006.01)
*B05B 7/06* (2006.01)
*B05B 13/02* (2006.01)

(52) U.S. Cl. .................. 118/323; 118/324; 118/314; 118/315

(58) Field of Classification Search ............... 118/324, 118/610, 603, 326, 500, 316, 423–425, 429, 118/304; 427/345; 204/198, 137, 273
See application file for complete search history.

(56) References Cited

U.S. PATENT DOCUMENTS

| | | | | | |
|---|---|---|---|---|---|
| 2,728,686 | A | * | 12/1955 | Borushko | 427/318 |
| 3,539,381 | A | * | 11/1970 | Kayarian | 427/335 |
| 4,289,090 | A | * | 9/1981 | Bagby et al. | 118/630 |
| 4,696,254 | A | | 9/1987 | Spindler | |
| 5,009,758 | A | * | 4/1991 | Okada et al. | 204/472 |
| 5,050,530 | A | * | 9/1991 | Studebaker et al. | 118/264 |
| 5,389,149 | A | | 2/1995 | Carey | |
| 5,395,451 | A | | 3/1995 | Triculis | |
| 6,164,558 | A | | 12/2000 | Holt | |
| 6,572,029 | B1 | | 6/2003 | Holt | |
| 6,689,217 | B2 | * | 2/2004 | Jarvis et al. | 118/423 |
| 6,705,545 | B1 | | 3/2004 | Sroka | |
| 6,884,293 | B2 | * | 4/2005 | Yip | 118/612 |

* cited by examiner

*Primary Examiner*—Yewebdar T Tadesse
(74) *Attorney, Agent, or Firm*—Niro, Haller & Niro

(57) ABSTRACT

An apparatus and method for painting a plurality of articles having a paint basin for holding paint, an article conveyor assembly for suspending and delivering articles to the basin, and a paint circulation and application system.

24 Claims, 3 Drawing Sheets

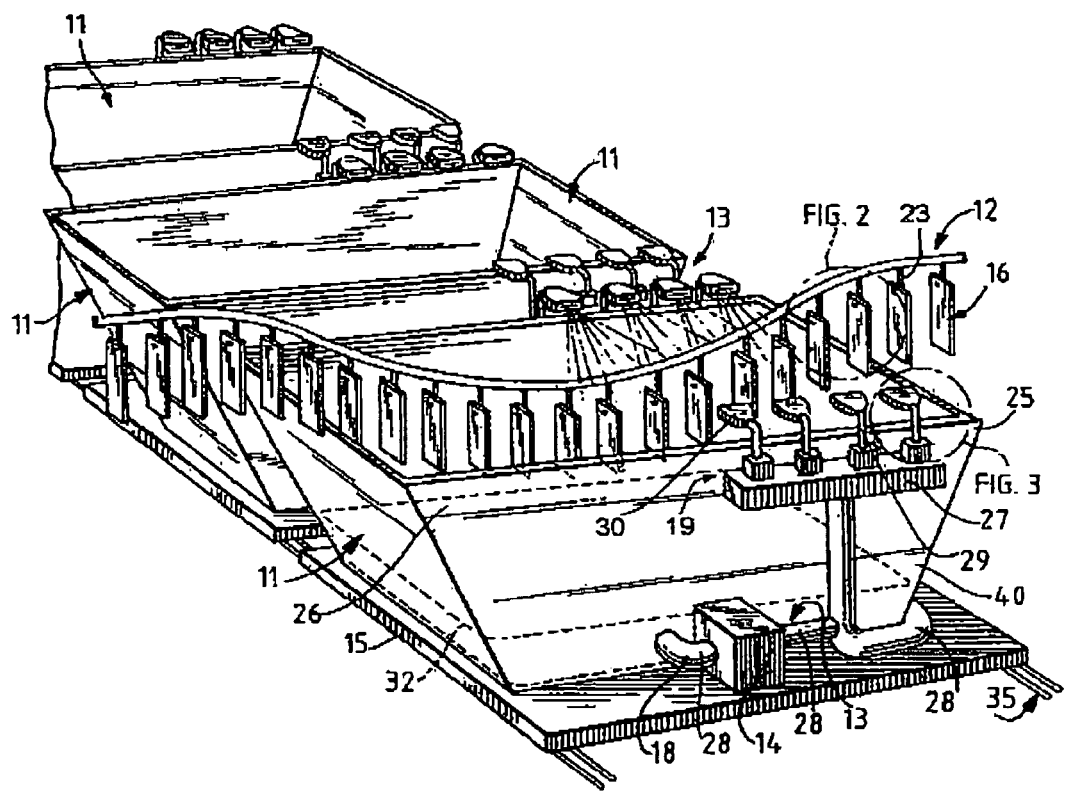

COMPACT PAINT SYSTEM

BACKGROUND OF THE INVENTION

The present inventions relate generally to the field of paint application systems. More particularly, the present inventions relate to compact paint systems that apply paint to multiple articles.

Paint systems have many commercial and industrial applications for painting articles that make up individual parts of a mass-produced machine or apparatus, particularly in circumstances where it is necessary to paint a plurality of similar articles. For instance, paint systems have been developed where a conveyor delivers articles and dips them into a large, paint-filled tank. Such systems may be advantageous because they apply a uniform coat of paint to the entire surface area of each article and are relatively fast.

Despite their effectiveness, dip-type paint systems of the prior art have inherent limitations, particularly for the painting of large articles. For example, dipping systems require large volumes of paint to be stored in bulky tanks that may remain stagnant for long periods of time. The large volume of paint in such tanks may lead to significant environmental, health, and financial burdens when the paint must be discarded or replaced. The nature of such tanks will also present mobility and space concerns. In addition, the absence of agitation in such tanks may affect paint quality and life.

Other types of assembly line paint systems typically utilize a pressure-controlled spray gun that is connected to a mobile paint-filled tank. Many such systems are operated either automatically or manually. The painting operation in such systems may also be carried out in a specified location that is associated with a drainage system for delivering the excess paint back to the tank. Such systems may be advantageous because they provide flexibility and mobility in applying paint.

However, since many spray paint systems require manual operation, they may produce health concerns for the operator. In addition, such systems may not always apply a uniform coat of paint to articles. Moreover, a distinct drainage area for recycling paint that is typically required in such systems may not be practical for use in plants with limited space. Likewise, paint recycling may not always be effective because excess paint from spray guns may diffuse and adhere to articles within the vicinity.

Therefore, there is a need for a compact, mobile and flexible painting system that uniformly applies paint to the surface area of multiple articles without requiring large volumes of paint or large painting areas. There is also a need for paint systems that agitate paint substantially continuously, operate automatically, and recycle paint efficiently. And, there is a need for paint systems that provide a convenient and efficient method of changing paint.

SUMMARY OF INVENTION

The present inventions preserve the advantages of known paint systems and also provide new features and advantages. For example, a preferred embodiment of the present invention provides a compact paint system for painting a plurality of articles. The paint system generally includes a paint basin for holding paint, an article conveyor assembly with multiple fasteners for suspending articles to be painted and delivering them to the basin for painting, and a paint circulation and application system. A preferred paint circulation and application system includes a conduit network having an inlet within the paint basin, a pump or other paint driving device and an outlet that is in close proximity to the travel path of the conveyor. A nozzle or nozzles may also be provided. In a preferred embodiment, the paint circulation and application system is associated with the paint basin and draws paint from the inlet and applies it to the articles. The excess paint is directed back into the paint basin. As a result, the paint in the basin is also agitated and circulated. The compact paint system of the present invention may also include a basin transport apparatus for transporting, changing or replacing basins. In other embodiments, the compact paint system of the present invention may include a plurality of basins that are in association with the basin transport apparatus. Paint color in such embodiments may be changed or replaced by activating the basin transport apparatus such that one paint basin is removed from the system and a new paint basin becomes associated with the article conveyor.

The present inventions also provide a method of painting a plurality of articles, including the steps of pouring paint into a paint basin that is associated with a paint circulation and application system; suspending a plurality of articles onto a plurality of fasteners on a conveyor with a travel path that spans the basin; activating the circulation and application system such that the system draws paint from the basin through an inlet and deposits paint back into the basin through an outlet; and, activating said conveyor to introduce the articles near the circulation and application system such that the flow path of the paint from the outlet is coincident with the travel path of the articles on the conveyor.

Accordingly, it is an object of the present invention to provide a compact, mobile and/or automatic paint application system.

Another object of the present invention is to provide a paint system that more uniformly applies paint to the surface of articles to be painted.

An additional object of the present invention is to provide a paint system that conserves, agitates and/or recycles paint.

Still another object of the present invention is to provide a paint system that efficiently enables changes of paint color.

Still an additional object of the present invention is to provide a paint system that provides flexibility to efficiently and effectively paint a large number of articles and takes-up a small amount of space.

A further object of the present invention is to provide a paint system that is economical, efficient and environmentally friendly.

Inventor's Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which:

FIG. 1 is a perspective view of a preferred embodiment of the compact paint system of the present invention;

FIG. 2 is an exploded perspective view of components of a preferred article conveyor assembly of the paint system of FIG. 1;

DETAILED DESCRIPTION OF THE PREFERRED EMBODIMENTS

Figure 3:
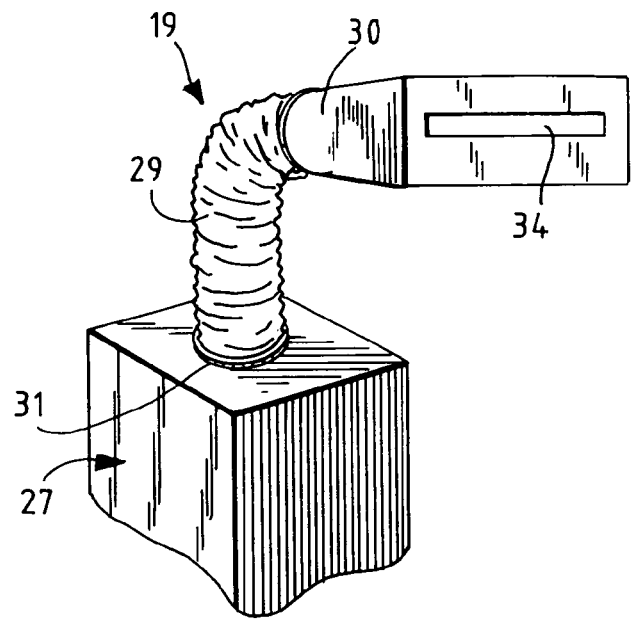
FIG. 3 is an exploded perspective view of components of a preferred outlet of a preferred paint circulation and application system of the paint system of FIG. 1.

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

A preferred embodiment of a compact paint application system of the present invention is shown generally as 10 in FIG. 1. Paint system 10 includes a paint basin 11 for holding paint and serving as a painting area, an article conveyor assembly 12 for suspending and transporting articles 16 to be painted to the paint basin 11 and a paint circulation and application system 13 for applying paint to articles 16 and for circulating paint within the paint basin 11. A basin transport apparatus 15 for transporting and changing paint basin 11 may also be provided. In general, the article conveyor assembly 12 transports the articles to be painted 16 to paint basin 11. Once the articles 16 reach paint basin 11, paint is applied to article 16 by the paint circulation and application system 13. After painting, excess paint on article 16 is permitted to drain back into paint basin 11 and the article 16 is conveyed out of paint basin 11 by article conveyor assembly 12.

In a preferred embodiment, paint basin 11 is a trapezoidally shaped metal tank 40, having slightly curved interior walls to aid in paint flow. Paint basin 11 is sized to accommodate the articles to be painted 16, since the painting of articles 16 occurs in paint basin 11, as well as an appropriate amount of paint. For example, in situations where structural components of rack type storage systems are being painted, paint basin 11 is capable of holding approximately 2200 gallons of paint. However, it is usually only necessary that basin 11 be filled with about 250-350 gallons of paint such that the paint reaches paint level 32. It will be understood by those of ordinary skill in the art that the amount of paint is dictated by the size of the paint basin 11 and the article to be painted 16. In addition, paint sufficient to enable paint circulation and application system 13 to properly operate is also required. These considerations are particular design parameters depending upon the application that will be known to those of ordinary skill in the art.

Paint circulation and application system 13 includes a paint intake or inlet 18 in fluid communication with basin 11, a pump 14 or other paint distribution device and a paint outlet or outlets 19. A conduit network 28, such as metal or plastic pipe or tubing, interconnects the various elements of application system 13. In a preferred embodiment, inlet 18 is located within the central bottom portion of paint basin 11 below paint level 32. This location is advantageous because most of the paint in the system will be concentrated in this area. Paint inlet 18 is connected to a pump 14 or other paint driving mechanism via conduit network 28. Pump 14 generally serves to circulate paint through paint application system 13, as well as applying paint to the articles 16. In a preferred embodiment, pump 14 is a diaphragm pump that is associated with a surge suppressor, such as a tranquilizer, for providing even paint flow (not shown). However, pump 14 may be a dynamic pump, positive displacement pump or manual pump. Other pumps or paint driving mechanisms, such as pneumatic valves, may also be suitable for use with the present invention, as will be understood by those of ordinary skill in the art.

Pump 14 is then fluidly connected to outlets 19, also via the conduit network 28. A preferred embodiment of outlet 19 is shown in more detail in FIG. 3. Outlets 19 include a flexible secondary conduit 29 that is attached to a paint spray nozzle 30, the flexibility of which enables the nozzle to be properly directed at the articles 16. Secondary conduit 29 may be attached to a manifold 27 to increase the number of outlets 19 and/or nozzles 30 by using a seal 31, such as a washer, clamp or other devices, as will be understood by those of ordinary skill in the art. Nozzle 30 is provided with a narrow opening or slit 34 that, among other things, enables the uniform application of paint to articles 16. A suitable flexible secondary conduit 29 for use in the compact paint system 10 is the Loc-Line® Vacuum Hose by Lockwood Products, Inc. An example of a nozzle suitable for use with the present invention 10 is the Loc-Line® Flare Nozzle by Lockwood Products, Inc.

Preferably, outlets 19 are located at the proximal end 25 of paint basin 11 in order to apply paint to articles 16 at an early stage upon their entry to basin 11. This will help provide sufficient time for excess paint to drain before the articles 16 exit basin 11. It is also desirable that paint application system 13 include a plurality of outlets 19 and nozzles 30 on each side of basin 11 near proximal end 25. This arrangement helps ensure that both sides of articles 16 are covered with paint in one paint cycle and aids in the circulation and agitation of paint within basin 11.

Articles 16 are delivered to paint basin 11 via paint conveyor system 12. In a preferred embodiment as shown in more detail in FIG. 2, conveyor system 12 includes a conveyor belt or chain 37 that travels about path of travel 20 on a track 33. Although the term belt is used, in a preferred embodiment, conveyor belt 37 is preferably an electrically-powered caterpillar drive chain that is in continuous motion. Conveyor belt 37 is also associated with a plurality of extensions or hangers 23 that contain fasteners 22 for suspending articles 16. Extensions 23 in the preferred embodiment are solid metal structures. Likewise, fasteners 22 are preferably metal hooks that suspend articles 16 through apertures 24 that are provided on the articles to be painted 16. In a preferred embodiment, the track 33 on conveyor assembly 12 contains two curvatures 21. The first curvature introduces articles 16 into basin 11 for painting and the second curvature removes the articles from the basin after they are painted. However, other alternatives are available, some of which are discussed below.

If desired and space permits, the compact paint system 10 of the present invention may also be provided with a means to change paint basin 11 and hence, paint colors. In a preferred embodiment, paint system 10 is associated with a plurality of basins 11 with different colors of paint associated with each basin 11. Each paint basin 11 is on a basin transport apparatus 15 in order to change basin 11. Transport apparatus 15 will allow the color in the paint system to be changed readily by adjusting the position of the basins 11 in relation to conveyor 12. To change paint color, transport apparatus 15 may be shifted such that conveyor 12 becomes associated with a new basin. In the preferred embodiment, transport apparatus 15 is a motor-powered transfer car that rides on rails 35. Other suitable transport devices that may also be used in the present invention include, but are not limited to, carts and flatbeds, as will be understood by those of ordinary skill in the art.

The operation of a preferred embodiment of compact paint system 10 is shown in FIG. 1. First, paint is poured into paint basin 11 to paint level 32 in order to ensure proper paint flow and circulation. Articles 16 are then suspended on fasteners 22 on conveyor 12. Paint circulation and application system 13 is activated, including pump 14, to initiate paint flow through the system 13. Conveyor 12 is also activated to convey articles 16 to proximal end 25 on paint basin 11. Paint is then applied to articles 16 as they travel through travel path 20, i.e., the conveyor system 12, and reach nozzles 30 of outlets 19. As the articles continue to travel on conveyor 12 through basin 11, excess paint drops back into the basin 11. In a preferred embodiment, the travel time through the basin may take approximately four to five minutes in order to ensure that all the excess paint is drained off. Moreover, once a paint cycle is completed, article conveyor assembly 12 and paint circulation and application system 13 may be inactivated, typically by deactivating pump 14. Depending upon the type of paint used and the articles 16 to be painted, articles 16 may remain suspended on conveyor 12 for a suitable amount of time until they are dry. Once removed, new articles 16 may be suspended onto the conveyor assembly 12. The entire paint cycle may then be repeated in the same paint basin 11. If desired, some or all of the operation may be electrically and/or computer controlled (not shown), as will be understood by those of skill in the art.

If a basin transport apparatus 15 is not used, operators of the compact paint system 10 of the present invention may manually change paint in individual paint basins 11. This usually requires draining the old paint, washing the paint basin 11 and filling the paint basin 11 with water and a suitable detergent. Pump 14 may then be actuated to initiate the flow of the detergent through paint circulation and application system 13 and basin 11. After a suitable amount of time, the paint basin 11 may be drained and replaced with pure water for rinsing the detergent out of the basin 11. After several washes, the operator may drain the water and pour in new paint.

It will be understood by those of skill in the art that numerous variations of the above described embodiments are available. For instance, basin 11 may be a cube, cylinder or another suitably shaped and sized structure. Likewise, basin 11 may be composed of a rigid plastic instead of a metal. In other embodiments, basin 11 may have a lower paint capacity to address space limitations in a plant. In further embodiments, basin 11 may have openings on its proximal 25 and distal 26 ends for receiving articles 16 (see FIGS. 5-7).

Figure 4:
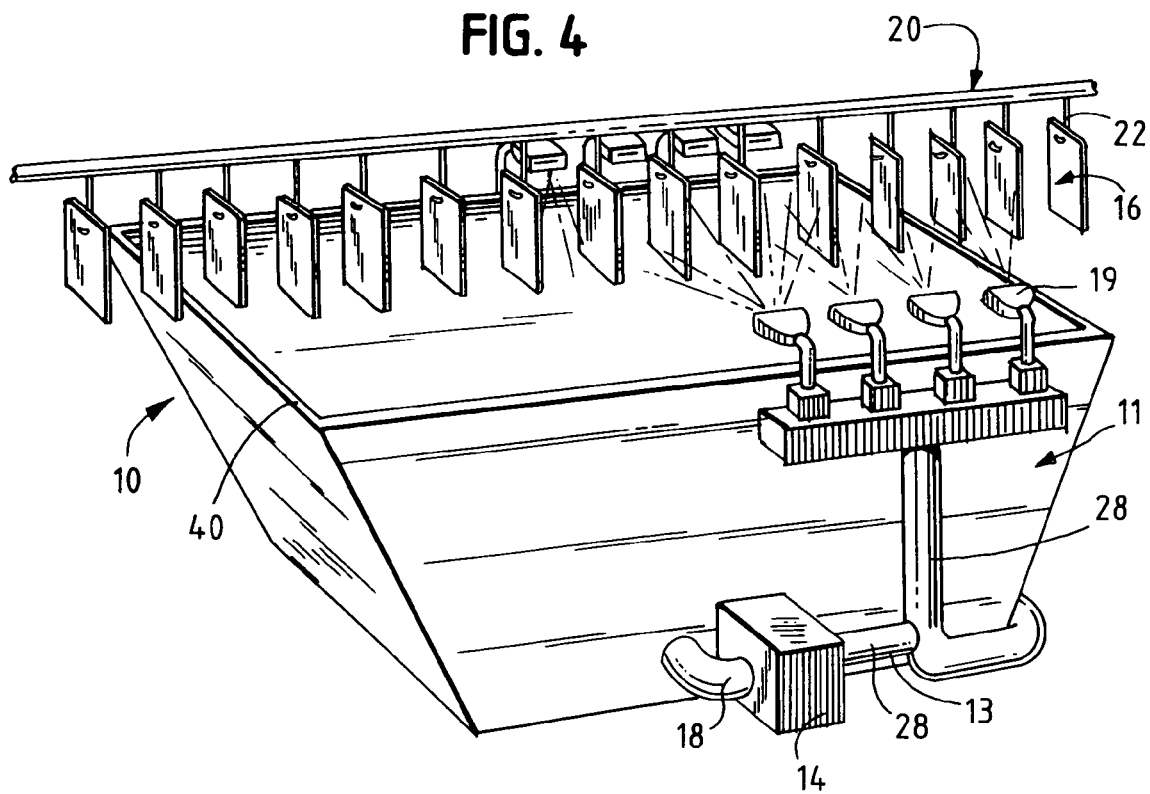
FIG. 4 is a perspective view of another embodiment of the paint system of the present invention showing a more compact paint basin.

Numerous embodiments for locations of outlets 19 are also suitable for use with the present invention. For instance, as shown in FIG. 4, outlets 19 may extend further above paint basin 11. In other embodiments, outlets 19 may be in direct fluid communication with conduit 28 without any association with manifolds 27. Likewise, alternative paint systems may utilize a single outlet on each side of basin 11 or only one outlet 19.

Alternative embodiments of conveyor belt 37 are also suitable for use with the present invention. For instance, conveyor belt 37 may be powered by pneumatic valves or operated manually. Conveyor belt 37 may be a plastic strap instead of a chain or belt. In other embodiments, extensions 23 from conveyor belt 37 may be ropes, chains, or other suitable structures. Similarly, fasteners 22 may comprise clamps or other suspension devices. In further embodiments, fasteners 22 may be directly associated with conveyor 12 without the need for extensions 23.

In addition, article conveyor assembly 12 of the preferred embodiment is contemplated to be stationary. However, other embodiments of the present invention may utilize mobile article conveyor assembly 12. Mobility may be conferred by wheels, rails, or other suitable devices on the base of the conveyors assembly (not shown). In such embodiments, the conveyor assembly 12 may be moved over different paint basins 11, instead of employing a basin transport apparatus 15 to change paint colors or types.

FIGS. 4-7 provide non-limiting examples of how the various embodiments of the present invention can be combined to produce various paint systems. For instance, in an alternative embodiment shown in FIG. 4, track 33 on conveyor 12 may retain articles 16 above basin 11. As a result, for paint to reach the entire surface area of the articles, outlets 19 extend further above basin 11. Such an embodiment may be suitable for use with small basins 11 that cannot accommodate large articles 16.

Figure 5:
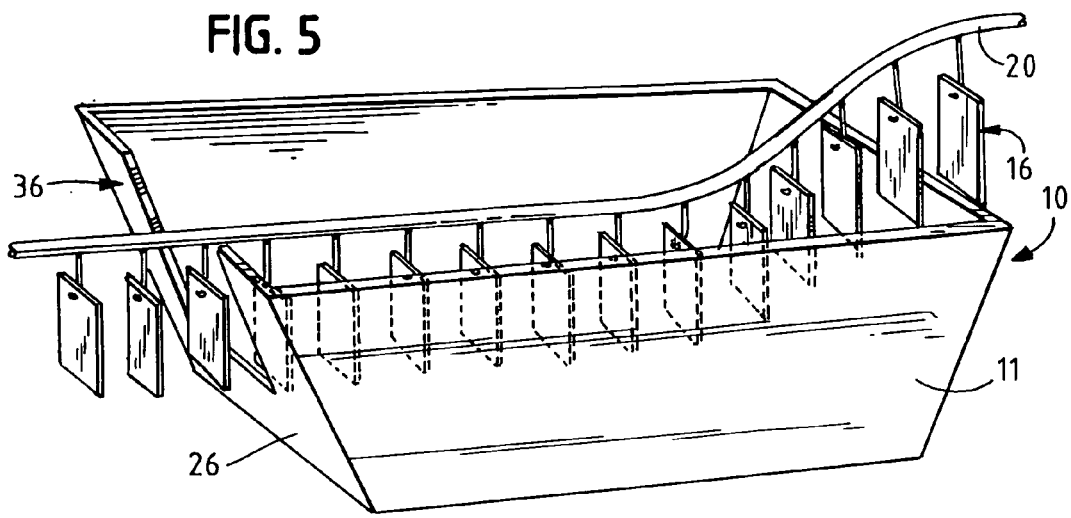
FIG. 5 is a perspective view of another embodiment of the paint system of the present invention showing a conveyor travel path that is coincident with the distal end of the basin.
Figure 6:
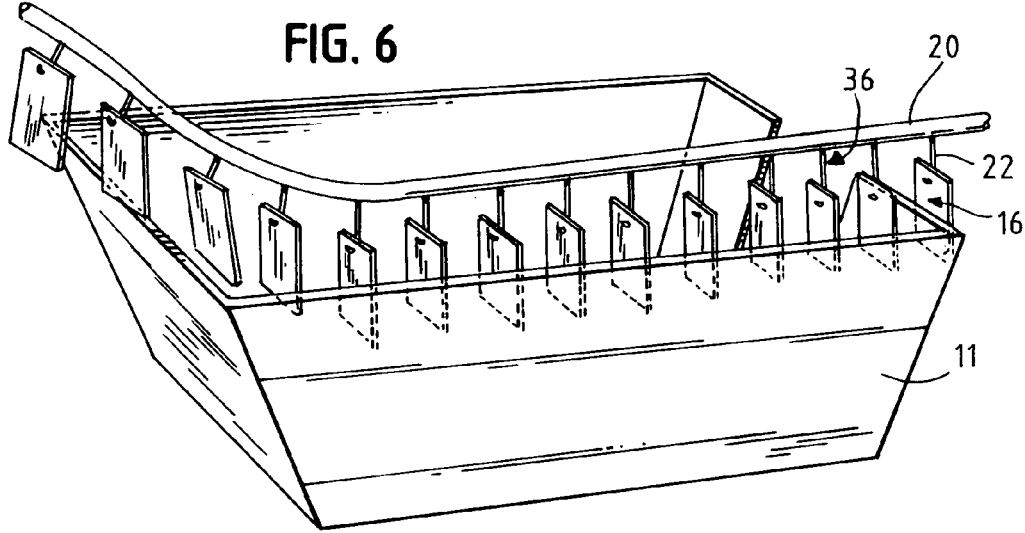
FIG. 6 is a perspective view of another embodiment of the paint system of the present invention showing a conveyor travel path that is coincident with the proximal end of the basin; and, FIG. 7 is a perspective view of another embodiment of the paint system of the present invention showing a conveyor travel path that is coincident with the entire length of the basin.
Figure 7:
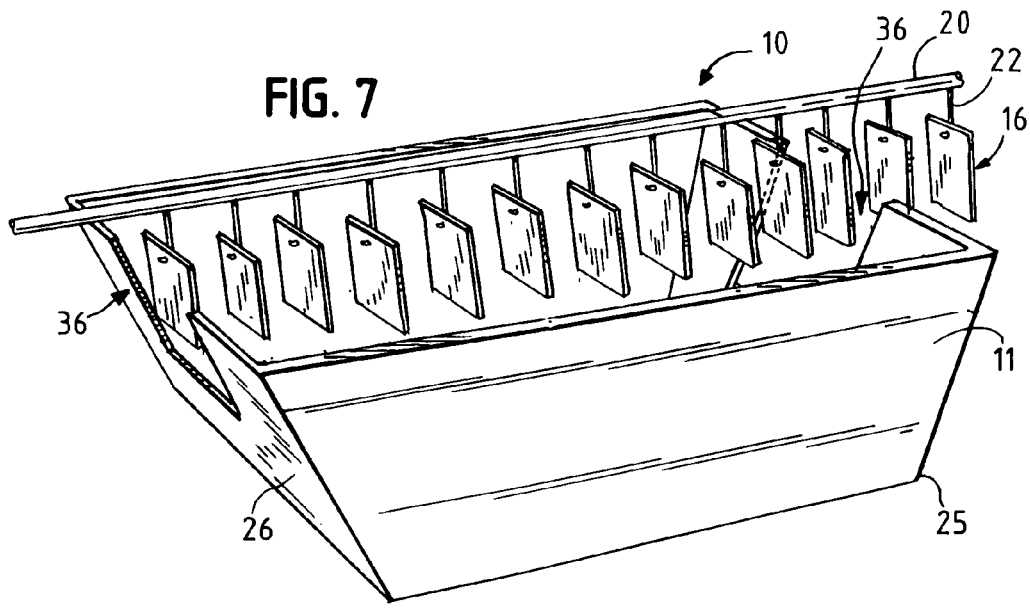

Likewise, FIGS. 5-7 illustrate paint systems having different basin 11 configurations and different travel paths 20. Those embodiments may be suitable for use in plants with vertical space limitations or different types/shapes of articles. For example, the travel path of conveyor 12 may be partially or completely coincident with the basin 11. FIG. 5 illustrates a paint system where the travel path 20 of conveyor assembly 12 is coincident with the distal end 26 of basin 11. In this embodiment, painted articles 16 exit basin 11 through an opening 36 at the basin's distal end 26. FIG. 6 illustrates an embodiment where the conveyor has a travel path that is coincident with the proximal end 25 of the basin 11. In this embodiment, the articles 16 enter the basin through an opening 36 in paint basin 11. Likewise, FIG. 7 illustrates an embodiment with a travel path 20 that is entirely coincident with paint basin 11. In this embodiment, articles 16 enter and exit basin 11 through openings 36 at the proximal 25 and distal 26 ends of the basin 11.

It will be evident that the present inventions will have numerous applications. For instance, in a preferred embodiment, articles 16 to be painted may be shelf beams for use in the construction of storage racks, trusses or shelves. In other embodiments, articles 16 may be bars, automobile parts, ceramics, frames, and the like. Such articles could be composed of wood, metal, plastic, or other compositions.

Finally, paints that may be suitable for use in the present invention include but are not limited to oil paints, water-based paints, acrylic paints, egg tempera paints, fresco paints and casein paints. However, it will be understood by those of ordinary skill in the art that if oil based paints are used, it is likely that plastic cannot be used for the components of the present invention. Various paint colors may also be used with the paint system of the present invention. These paint colors may be derived from various chemicals. Examples of such chemicals include but are not limited to natural inorganic pigments, artificial inorganic pigments, natural organic pigments, and synthetic organic pigments.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. An apparatus for painting a plurality of articles, comprising:
   a paint basin having sidewalls for holding paint and serving as an article painting area;
   an article conveyor assembly having a path of travel coincidental with said paint basin for delivering the articles to said paint basin for painting having a path of travel through said paint basin;
   a paint circulation and application system having an inlet in said paint basin, an outlet independent of said paint basin sidewalls and having an adjustable nozzle flexibly connected to said outlet such that said adjustable nozzle may be directed at said articles, and a pump in fluid communication with said inlet and outlet via a primary conduit network such that paint is drawn through the inlet and applied to the article through said adjustable nozzle at said outlet; and,
   said primary conduit network including a manifold in fluid communication with said outlet, and said outlet including a plurality of outlets, and said adjustable nozzle including a plurality of adjustable nozzles flexibly connected to each of the plurality of outlets.

2. The apparatus of claim 1 further comprising a paint basin transport apparatus in association with said paint basin.

3. The apparatus of claim 1 comprising a plurality of paint basins.

4. The apparatus of claim 1 wherein said plurality of paint basins are associated with said paint basin transport apparatus.

5. The apparatus of claim 1 wherein said flexible connection comprises a secondary conduit network having a proximal end and a nozzle attached to said proximal end.

6. The apparatus of claim 1 wherein said article conveyor travel path has a vertical curvature for introducing said articles into said paint basin.

7. The apparatus of claim 1 wherein said article conveyor travel path has a vertical curvature for removing said articles from said paint basin.

8. The apparatus of claim 1 wherein said article conveyor travel path is straight.

9. The apparatus of claim 1 wherein said articles remain above said paint basin.

10. The apparatus of claim 1 wherein said articles enter said paint basin through an opening on an outer wall of said paint basin.

11. The apparatus of claim 1 wherein said articles exit said paint basin through an opening on an outer wall of said paint basin.

12. The apparatus of claim 1 wherein said article conveyor travel path is circular.

13. The apparatus of claim 1 wherein said article conveyor travel path is linear.

14. The apparatus of claim 1 wherein said article conveyor is stationary.

15. The apparatus of claim 1 wherein said article conveyor is mobile.

16. The apparatus of claim 1 wherein a fastener on said article conveyor is a hook.

17. The apparatus of claim 1 wherein said primary conduit network is comprised of plastic pipes.

18. The apparatus of claim 1 wherein said adjustable nozzle includes an opening which is above a sidewall of said paint basin.

19. An apparatus for applying paint to a plurality of articles to be painted comprising:
    a paint basin;
    a paint circulation and application system associated with said paint basin including an inlet, a pump and an outlet for said paint, wherein said outlet includes an adjustable nozzle, said adjustable nozzle being independent of said basin and capable of being selectively directed at said articles, and wherein said outlet includes a plurality of outlets and said adjustable nozzle includes a plurality of adjustable nozzles, wherein each of the plurality of adjustable nozzles adjustably connect to each of the plurality of outlets; and,
    an article conveyor assembly having a belt for suspending articles and a path of travel of said conveyor assembly into and out of said paint basin.

20. The invention of claim 19 wherein the article conveyor assembly is stationary.

21. The invention of claim 19 wherein the article conveyor assembly is moveable.

22. The invention of claim 19 wherein a paint basin transport apparatus is provided.

23. The invention of claim 19 wherein an electronic control means to automatically operate the apparatus is provide.

24. The invention of claim 19 wherein said adjustable nozzle has an opening which is above said paint basin.

* * * * *